(12) United States Patent
Miller

(10) Patent No.: US 9,437,369 B2
(45) Date of Patent: Sep. 6, 2016

(54) CONDUCTIVE MATERIAL WITH CHARGE-STORAGE MATERIAL IN VOIDS

(71) Applicant: JME, Inc., Beachwood, OH (US)

(72) Inventor: John R. Miller, Beachwood, OH (US)

(73) Assignee: JME, Inc., Beachwood, OH (US)

( * ) Notice: Subject to any disclaimer, the term of this patent is extended or adjusted under 35 U.S.C. 154(b) by 63 days.

(21) Appl. No.: 14/407,125

(22) PCT Filed: Jul. 10, 2013

(86) PCT No.: PCT/US2013/049841
§ 371 (c)(1),
(2) Date: Dec. 11, 2014

(87) PCT Pub. No.: WO2014/011722
PCT Pub. Date: Jan. 16, 2014

(65) Prior Publication Data
US 2015/0235776 A1    Aug. 20, 2015

Related U.S. Application Data

(60) Provisional application No. 61/670,335, filed on Jul. 11, 2012.

(51) Int. Cl.
*H01G 11/36* (2013.01)
*H01G 11/56* (2013.01)
*H01G 11/04* (2013.01)

(52) U.S. Cl.
CPC ............. *H01G 11/36* (2013.01); *H01G 11/04* (2013.01); *H01G 11/56* (2013.01); *Y10T 428/24446* (2015.01); *Y10T 428/30* (2015.01)

(58) Field of Classification Search
CPC ....... H01G 11/36; H01G 11/04; H01G 11/56
See application file for complete search history.

(56) References Cited

U.S. PATENT DOCUMENTS 7,445,870 B2 * 11/2008 Taguchi ................. H01G 9/155
                                                          361/500
7,623,340 B1    11/2009 Song et al.
(Continued)

FOREIGN PATENT DOCUMENTS

CN    103219166 A    7/2013
JP    2005259760 A   9/2005
(Continued)

OTHER PUBLICATIONS

El-Kady, Maher F. et al., "Laser Scribing of High-Performance and Flexible Graphene-Based Electrochemical Capacitors," Science, (Mar. 2012), pp. 1326-1330, vol. 335, American Association of the Advancement of Science.
(Continued)

*Primary Examiner* — David M Sinclair
(74) *Attorney, Agent, or Firm* — Renner, Otto, Biosselle & Sklar, LLP

(57) ABSTRACT

A conductive material includes a graphene-nanonsheet material, with charge-storage material in voids in and/or coating the graphene material. The charge-storage material may include any of a variety of types of carbon, including carbon black, acetylene black, furnace black, carbon fibers, carbon nanotubes, graphene in the form of wrinkled sheets of graphene, carbon nano-onions, or hydrothermal-synthesized nanospheres of carbon material. Alternatively, the charge-storage material may be non-carbon pseudocapacitive materials. Also, the charge-storage material may involve Faradaic processes similar to those observed with battery electrodes. The conductive material may be formed or placed on a conductive or a dielectric substrate. One or more gaps may be formed in the conductive material, with the conductive material forming two or more electrodes. The electrodes may then be covered with an electrolyte material, to produce an electric double layer capacitor.

16 Claims, 9 Drawing Sheets

(56) References Cited

U.S. PATENT DOCUMENTS

| | | | | |
|---|---|---|---|---|
| 7,852,612 | B2* | 12/2010 | Zhao | H01G 11/36 252/502 |
| 8,264,818 | B2* | 9/2012 | Tamachi | H01G 9/016 361/502 |
| 8,976,507 | B2* | 3/2015 | Aria | B82Y 10/00 361/502 |
| 2006/0121342 | A1* | 6/2006 | Sano | H01M 4/13 429/162 |
| 2007/0258192 | A1* | 11/2007 | Schindall | B82Y 30/00 361/503 |
| 2009/0047520 | A1* | 2/2009 | Lee | B82Y 15/00 428/408 |
| 2010/0035093 | A1* | 2/2010 | Ruoff | H01G 11/36 429/493 |
| 2010/0224998 | A1* | 9/2010 | Duvall | H01L 21/288 257/767 |
| 2010/0239907 | A1* | 9/2010 | Izumi | H01G 9/016 429/220 |
| 2011/0075322 | A1* | 3/2011 | Kuriki | H01G 11/02 361/502 |
| 2011/0204020 | A1* | 8/2011 | Ray | B82Y 25/00 216/13 |
| 2012/0134072 | A1* | 5/2012 | Bae | H01G 11/28 361/502 |
| 2012/0170171 | A1* | 7/2012 | Lee | H01G 11/36 361/502 |
| 2012/0236467 | A1* | 9/2012 | Kang | B82Y 10/00 361/502 |
| 2013/0052489 | A1* | 2/2013 | Zhamu | B82Y 30/00 429/50 |

FOREIGN PATENT DOCUMENTS

| | | | |
|---|---|---|---|
| JP | 2005268263 A | * | 9/2005 |
| WO | 2007137794 A1 | | 12/2007 |
| WO | 2010028162 A2 | | 3/2010 |
| WO | 2011143777 A1 | | 11/2011 |

OTHER PUBLICATIONS

Kossyrev, Pavel, "Carbon Black Supercapacitors Employing Thin Electrodes," Journal of Power Sources, (Mar. 2012), pp. 347-352, vol. 201, Elsevier B.V.

Lipka, Stephen M. et al., "Hydrothermal Carbonization of Biomass as Active Materials for Electrochemical Capacitors," 21st International Seminar on Double Layer Capacitors & Hybrid Energy Storage Devices, (Dec. 2011), Supercapacitor Seminar Presentations, Redox Engineering, LLC., Deerfield Beach.

Lipka, Stephen M. et al., "High Performance Activated Carbons for Ion Storage," Center for Applied Energy Research, University of Kentucky.

Miller, John R. et al., "Fundamentals of Electrochemical Capacitor Design and Operation," The Electrochemical Society Interface, (2008), pp. 31-32.

Miller, John R., "Introduction to Electrochemical Capacitor Technology," Electrical Insulation Magazine, (Jul. 2010), pp. 40-47, vol. 26, No. 4, IEEE.

Miller, John R. et al., "Graphene Double-Layer Capacitor with ac Line-Filtering Performance," Science, (Sep. 2010), pp. 1637-1639, vol. 329, American Association of the Advancement of Science.

Miller, John R. et al., "Performance of Vertically-Oriented Graphene Nanosheet Double-Layer Capacitors with Ionic Liquid Electrolyte," The 62nd Annual Meeting of the International Society of Electrochemistry, (Sep. 2011), Nigata, Japan.

Miller, John R. et al., "Activated Carbon/Aqueous Electrolyte Pseudocapacitance Observed at Potentials Below NHE," The 62nd Annual Meeting of the International Society of Electrochemistry, (Sep. 2011), Nigata, Japan.

Miller, John R. et al., "Valuing Reversible Energy Storage," Science, (Mar. 2012), pp. 1312-1313, vol. 335, American Association of the Advancement of Science.

Pech, David et al., "Ultrahigh-power Micrometre-sized Supercapacitors Based on Onion-like Carbon," Nature Nanotechnology, (Aug. 2010), pp. 651-654, vol. 5, No. 7, Macmillan Publishers Limited.

Pech, David et al., "Influence of the Configuration of Ruthenium(IV) oxide Thin Films Electrochemical Micro-Capacitors," 2nd International Symposium on Enhanced Electrochemical Capacitors ISEE, (Jun. 2011), Poznan, Poland.

Sassin, Megan B. et al., "Electroless Deposition of Conformal Nanoscale Iron Oxide on Carbon Nanoarchitectures for Electrochemical Charge Storage," ACS Nano, (Jul. 2010), pp. 4505-4514 and S1-S14, vol. 4, No. 8, American Chemical Society.

Sassin, Megan B. et al., "Redox Deposition of Nanoscale Metal Oxides on Carbon for Next-Generation Electrochemical Capacitors," Accounts of Chemical Research, (2013), pp. A-M, vol. 46, No. 5, American Chemical Society.

Wang, J.J. et al., "Free-standing Subnanometer Graphite Sheets," Applied Physics Letters, (2004), pp. 1265-1267, vol. 85, No. 7, American Institute of Physics.

International Search Report and Written Opinion of corresponding International Application No. PCT/US13/49841, dated Jan. 2, 2014.

* cited by examiner

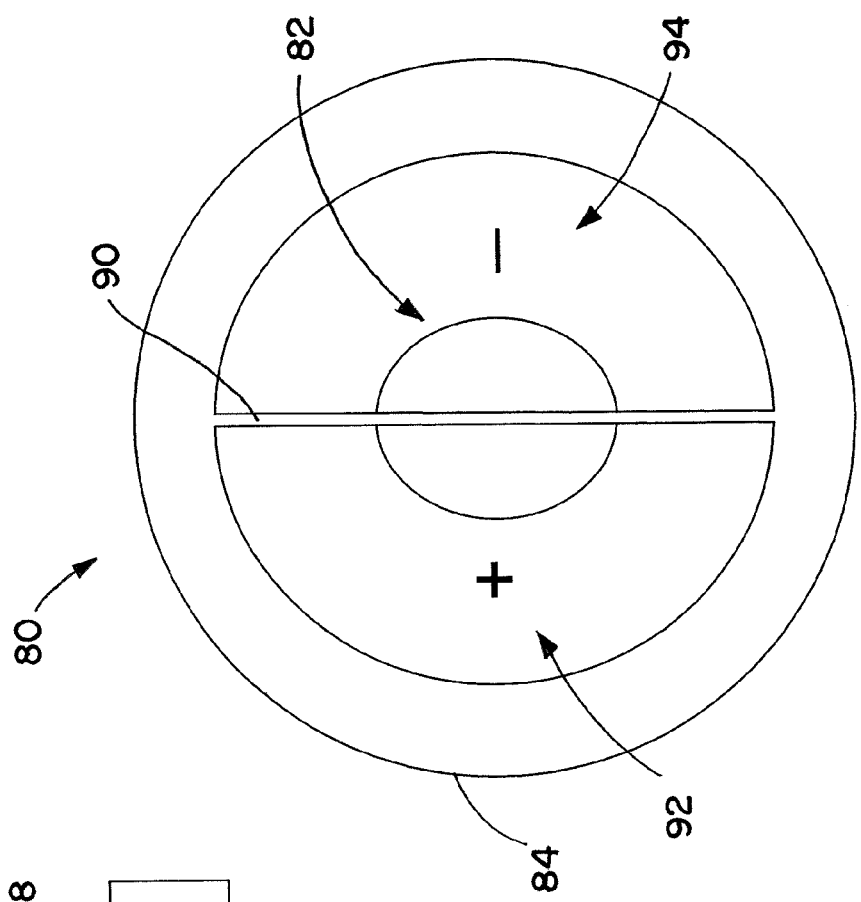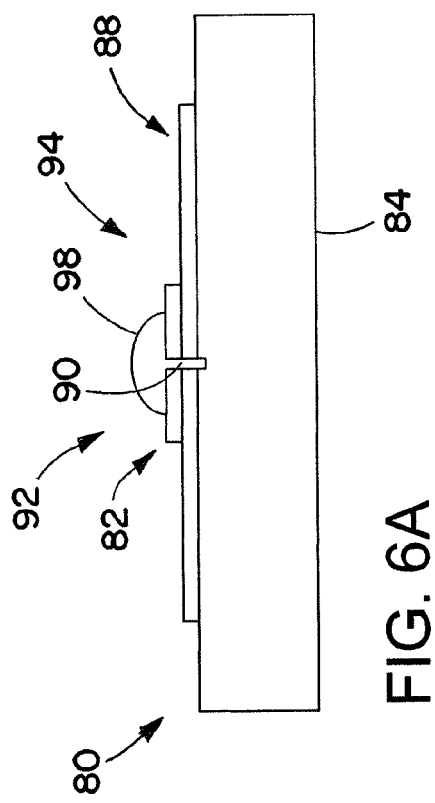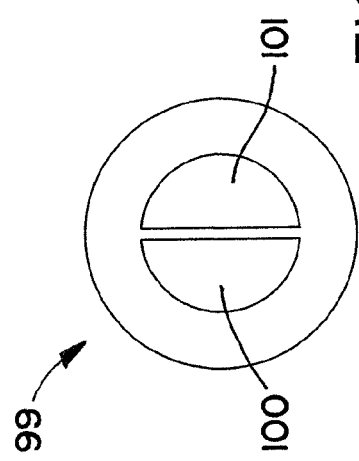

CONDUCTIVE MATERIAL WITH CHARGE-STORAGE MATERIAL IN VOIDS

BACKGROUND OF THE INVENTION

1. Field of the Invention

The invention is in the field of energy storage devices.

2. Description of the Related Art

Electric double layer capacitors (EDLCs), sometimes referred to as supercapacitors or ultracapacitors, are increasingly being used in power applications because of their high power performance, long cycle life, exceptional cycle efficiency, stable operation over a wide range of temperatures, and unexcelled reliability. Such EDLCs offer significant benefits over aluminum electrolytic capacitors, which are notoriously unreliable. However, there is a continuing need for improvements in performance and other specifications of capacitor devices.

SUMMARY OF THE INVENTION

According to an aspect of the invention, a conductive material includes: vertically-oriented graphene nanosheet material; and charge-storage material amid the vertically-oriented graphene material.

According to another aspect of the invention, a method of producing a conductive material, the method including: forming a vertically-oriented graphene nanosheet material; and placing charge-storage material amid the vertically-oriented graphene material.

According to yet another aspect of the invention, a capacitor includes: a dielectric substrate; a conductive substrate on the dielectric substrate; vertically-oriented graphene nanosheet material on the conductive substrate; charge-storage material amid the vertically-oriented graphene material; and an electrolyte; wherein the conductive substrate, the graphene nanosheet material, and the charge-storage material are separated into at least two electrodes, with a gap therebetween; and wherein the electrolyte spans the gap, and is in contact with one or both of the graphene nanosheet material and the charge-storage material on both sides of the gap.

According to a further aspect of the invention, a planar capacitor device includes: a dielectric substrate; a conductive material layer on the dielectric substrate, wherein the conductive material layer has at least two gaps therein, forming separate electrodes; and electrolyte material in separate strips covering respective of the gaps, with each electrolyte material strip in contact with the electrodes on opposite sides of the respective gap, the electrodes and the electrolyte material strips thereby forming multiple capacitors that are electrically coupled together.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 6A is a cross-sectional view of an electric double layer capacitor, in accordance with another embodiment of the invention.

FIG. 6B is a plan view of the electric double layer capacitor of FIG. 6A.

FIG. 7 is a plan view of an electric double layer capacitor, in accordance with yet another embodiment of the invention.

DETAILED DESCRIPTION

A conductive material includes a graphene-nanonsheet material, with charge-storage material in voids in and/or coating the graphene material. The charge-storage material may include any of a variety of types of carbon, including carbon black, acetylene black, furnace black, carbon fibers, carbon nanotubes, graphene in the form of wrinkled sheets of graphene, carbon nano-onions, or hydrothermal-synthesized nanospheres of carbon material. Alternatively, the charge-storage material may be non-carbon pseudocapacitive materials. Also, the charge-storage material may involve Faradaic processes similar to those observed with battery electrodes. The conductive material may be formed or placed on a conductive or a dielectric substrate. One or more gaps may be formed in the conductive material, with the conductive material forming two or more electrodes. The electrodes may then be covered with an electrolyte material, to produce an electric double layer capacitor. The charge storage material may account for a vast majority (i.e., 80% or more) of the charge storage of the electric double layer capacitor. Various devices may include such conductive materials. Alternatively or also, the devices may have various novel configurations and/or features.

Figure 1:
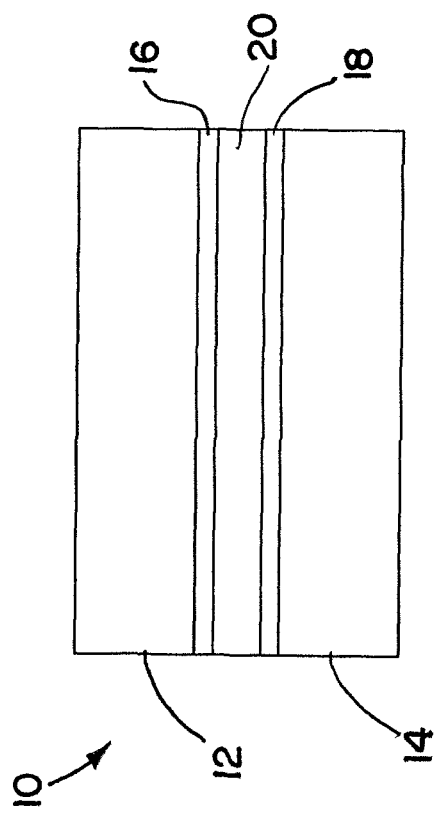
FIG. 1 is a side view of a prior art electric double layer capacitor.

FIG. 1 shows a prior art electric double layer capacitor (EDLC) 10. The EDLC 10 has a pair of current collectors 12 and 14, made of a conductive material such as metal. On facing surfaces of the metal layers 12 and 14 are graphene layers 16 and 18, with an electrolyte-containing separator 20 between the graphene layers 16 and 18. In such a configuration a majority of the volume is occupied by the metal current collectors 12 and 14 (each of which may be 75 µm thick), and the separator 20 (which may have a thickness of 25 µm). The active graphene layers 16 and 18 may occupy only a small percentage of the volume of the device 10, such as less than 1% of the volume.

Figure 2:
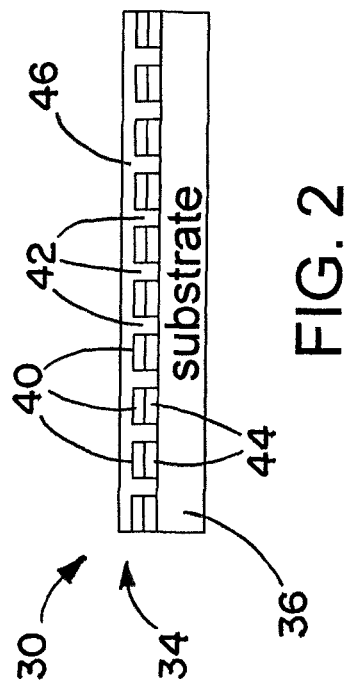
FIG. 2 is a side view of an electric double layer capacitor in accordance with an embodiment of the invention.

The arrangement of the EDLC 10 contrasts with the EDLC 30 shown in FIG. 2. The EDLC 30 has a conductive material 34, described in detail below, which is formed on a dielectric substrate 36. The conductive material 34 includes a series of electrodes 40, with gaps 42 therebetween. Conductive fingers 44 are between the conductive material 34 and the substrate 36. The electrodes 40 and the gaps 42 are covered by an electrolyte layer 46. Compared with the prior art EDLC 10 (FIG. 1), the EDLC 30 has considerably higher efficiency on a volume basis, and thus offers the potential for both higher energy density and higher power density. In addition, the planar design of the EDLC 30 may be flexible, if a flexible material is used for the substrate 36. Flexible energy storage devices may be important for some applications, for instance as conformal coatings.

Figure 3:
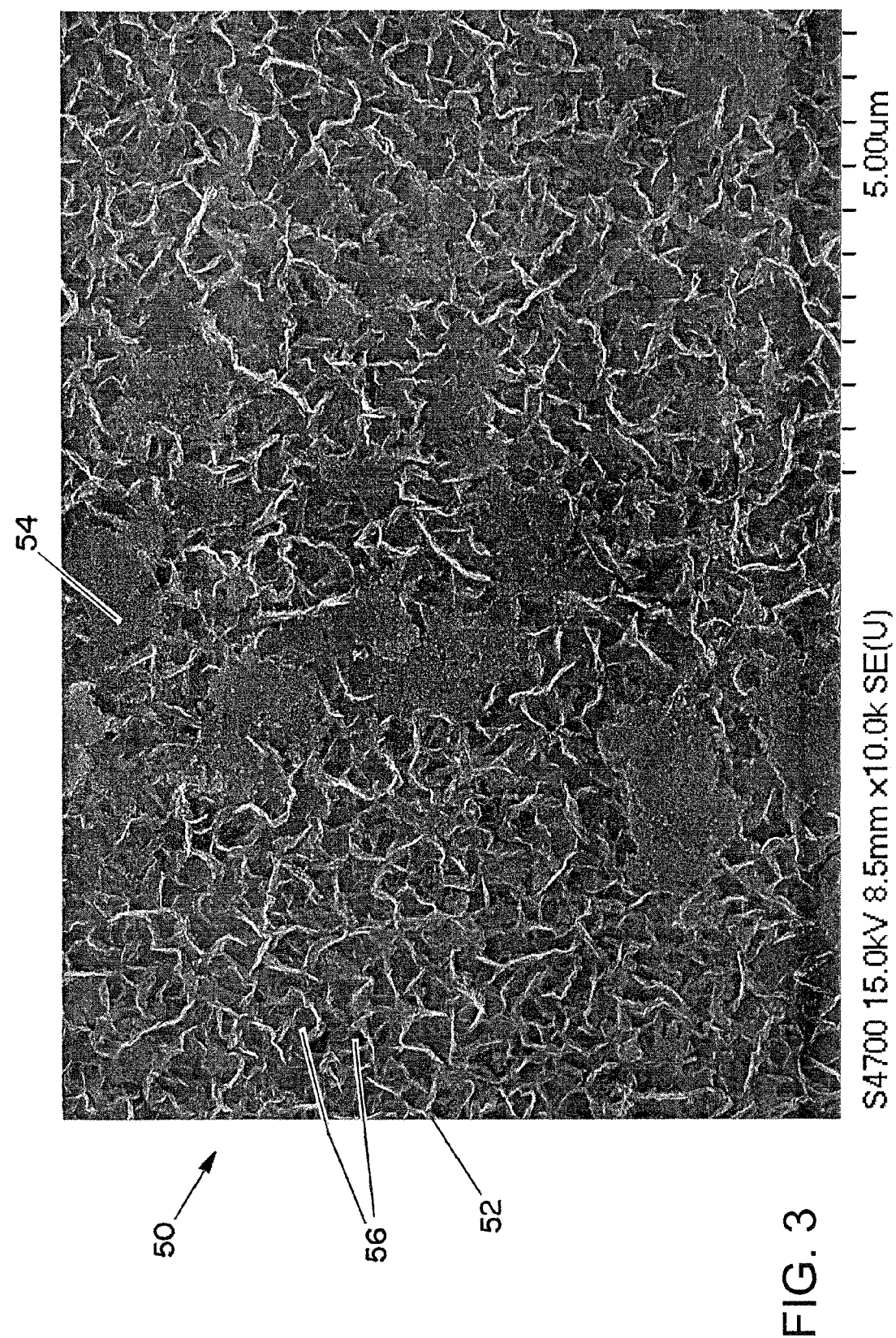
FIG. 3 is a first magnified photograph of a conductive material usable in the electric double layer capacitor of FIG. 2.
Figure 4:
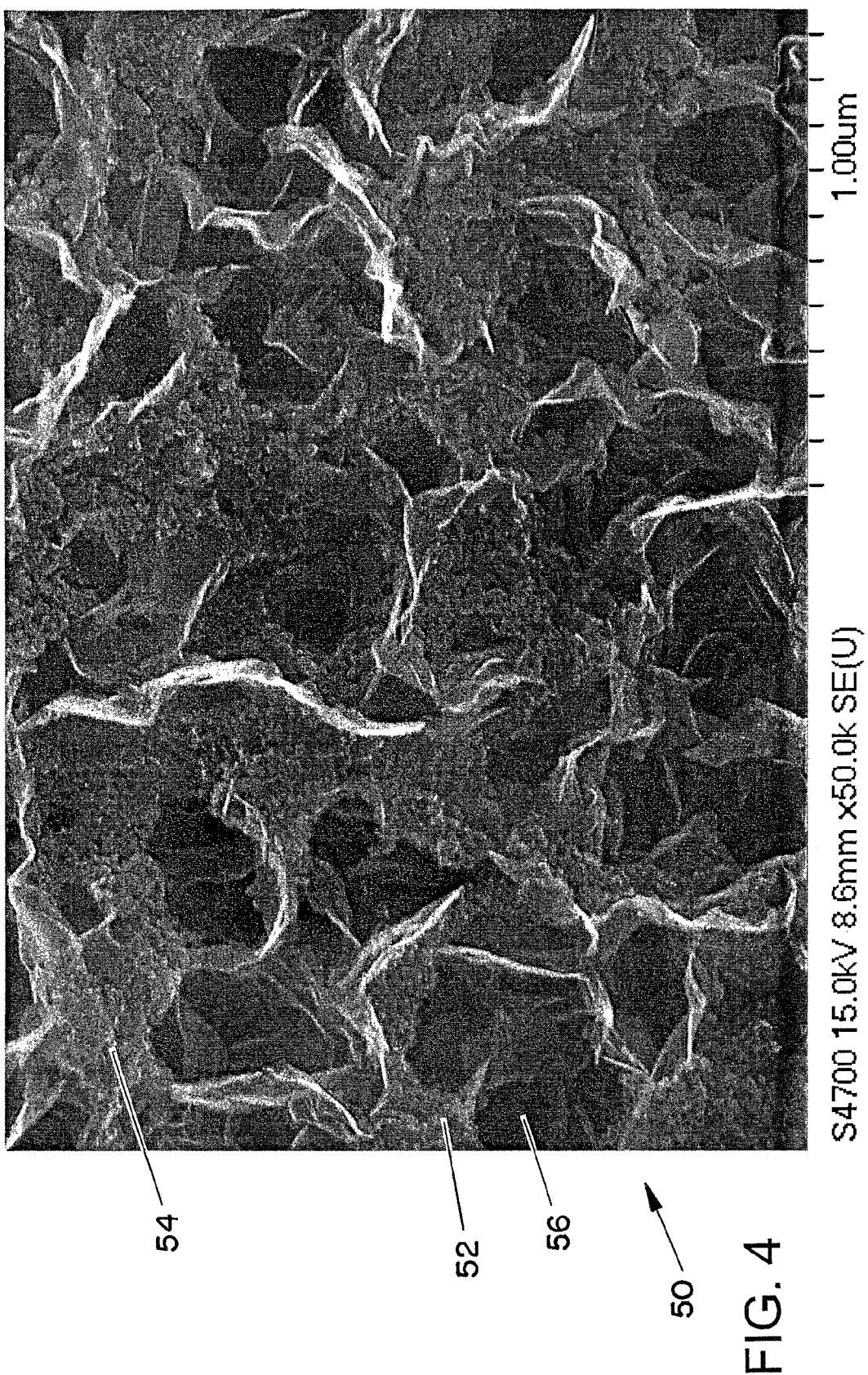
FIG. 4 is a second magnified photograph of the conductive material.
Figure 5:
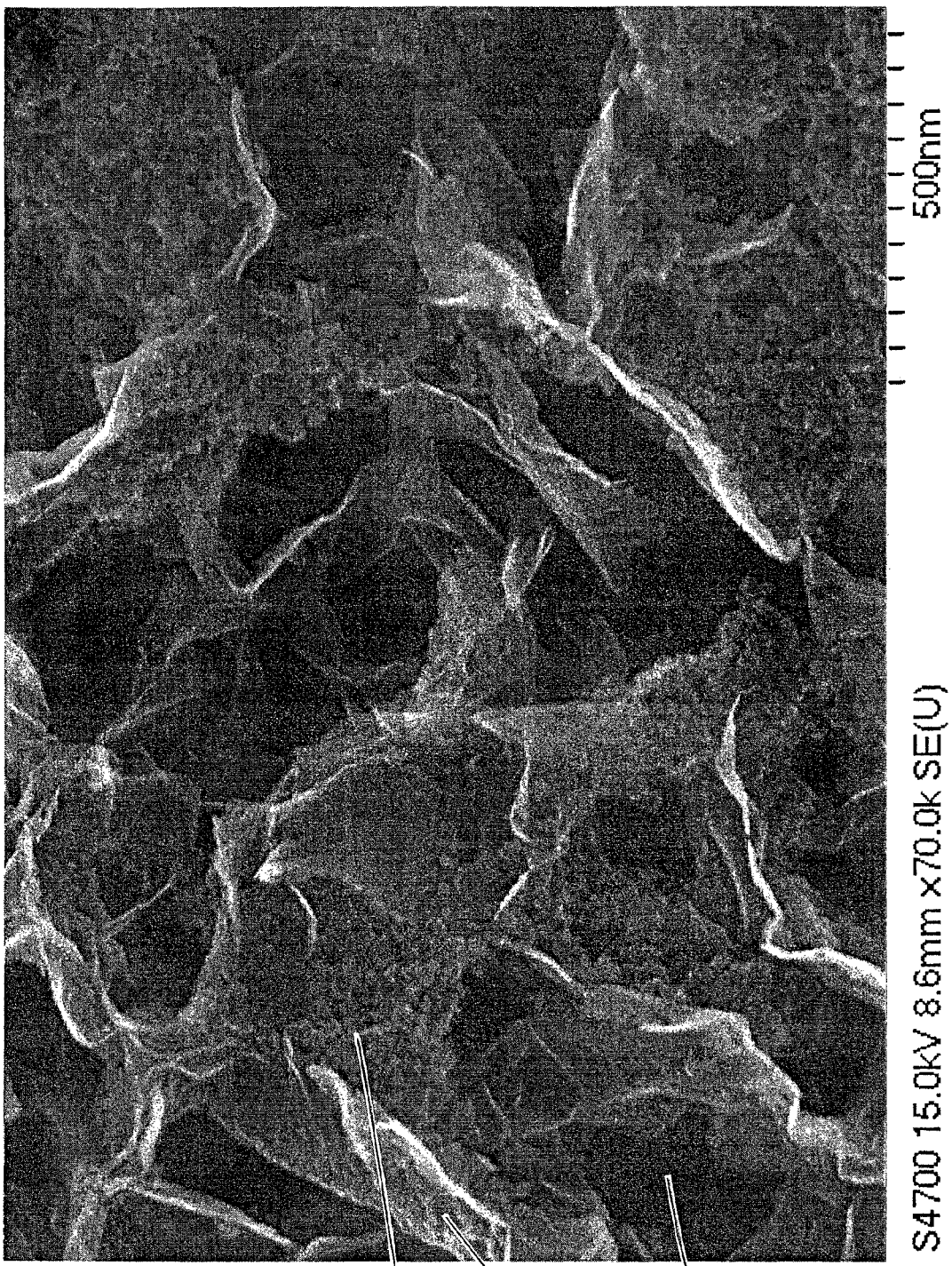
FIG. 5 is a third magnified photograph of the conductive material.

FIGS. 3-5 show a conductive material 50 that may be used as the conductive material 34 (FIG. 2). The conductive material 50 includes a vertically-oriented graphene nanosheet material 52, with charge-storage material 54 in voids 56 in the vertically-oriented graphene material 52. The term "vertically-oriented graphene material" is used herein to mean free standing, less than 1 nm thick graphite sheets, as described in "Free-standing subnanometer graphite sheets", Applied Physics Letters 85 (7), 1265 (2004). Vertically oriented means the angle between the graphite sheet and the substrate is in the range greater than 0 degrees and less than or equal to 90 degrees. The conductive material 50 may have about three or more layers of graphene in contact with the substrate. The free-standing graphene, i.e. the graphene not in contact with the substrate, may have three or more graphene layers at the point it makes contact with the substrate, and one or more layers of graphene at locations most distant from the substrate (edge), making up the vertically-oriented graphene nanosheet material 52. The voids 56 are formed or occur naturally in such vertically-oriented graphene sheet material 52. At least some of the voids 56 contain charge-storage material 54, and as a result the charge-storage material 54 has improved electrical connection to the substrate. The conductive material 50 itself may function as the current collectors of the EDLC 30 (FIG. 2), in contrast to the separate current collectors 12 and 14 (FIG. 1) needed in the prior art EDLC 10 (FIG. 1).

The charge-storage material 54 may be any of a wide variety of electrically conductive materials. Charge storage materials may rely on electric double layer charge storage, pseudocapacitive charge storage, or faradaic charge storage, or charge storage relying on a combination of more than one of these or other mechanisms. The charge-storage material include a carbon-containing material, such as carbon black, carbon fibers, carbon nanotubes, graphene in the form of wrinkled sheets of graphene, graphene in the form of onion-like carbon (such as described at Nature Nanotechnology, vol. 5, pp. 651-654 (2010)), graphene in the form of hydrothermal-synthesized nanospheres of carbon (see, e.g., "Hydrothermal Carbonization of Biomass as Active Materials for Electrochemical Capacitors", by S. Lipka at the "21$^{st}$ International Seminar on Double Layer Capacitors & Hybrid Energy Storage Devices," Deerfield Beach, Fla., Dec. 5-7, 2011). Alternatively, the charge storage material may include a pseudo capacitor material, such as one or more of ruthenium oxide, iridium oxide, vanadium nitride, manganese dioxide, iron oxide, and tungsten oxide. As a further alternative, the charge storage material may include a polymer charge storage material (also a pseudo capacitor material), such as one or more of polythiophene, polypyrrole, polyanaline, and polyacetylene. And as a further alternative, the charge storage material may involve intercalation materials like found in lithium ion battery anodes, for example graphite or lithium titanate. And as a further alternative the charge storage material may include materials that rely on faradaic charge storage processes, i.e. involve an electron transfer. Examples include battery electrode materials like NiOOH, PbOx, Pb, Ni, Li, Zn, Mg, mercuric oxide, silver oxide, Fe, and Cd. Additional examples include lithium ion battery cathode materials, for example, lithium cobalt oxide (LCO), lithium manganese oxide (LMO), lithium iron phosphate (LFP), and lithium nickel manganese cobalt oxide (NMC) among a host of others. And yet a further example, the charge storage material may include combinations of different materials.

The voids may range in size from tens of nanometers to many micrometers, and the charge storage material particles are of a size that allows them to enter into and coat the surface of a void or to partially fill a void.

The charge storage material may include a binder to aid in retaining the charge storage material in the voids 56. The binder may include one or more of polytetrafluoroethylene (PTFE), polyvinylidene (PVDF), polyvinyl fluoride (PVF), polyethylene oxide (PEO) or rubber-based butyl styrene The charge-storage material 54 may be placed in the voids 56 by any of a variety of suitable methods. To give one example, a liquid that contains a solvent and the charge-storage material 54 may be placed on the graphene nanosheet material 52, with the solvent then evaporated. For example, carbon black may be dispersed in water that is put on the graphene nanosheet material 52, with the water then removed (evaporated) by heating in an oven.

As another example, the charge-storage material 54 may be printed onto the graphene nanosheet material 52 by a suitable printing process, such as screen printing. As a further alternative, the charge-storage material 54 may be deposited in the voids 56 by suitable deposition processes, such as vacuum evaporation, sputter deposition, chemical vapor deposition, plasma assisted chemical vapor deposition, ion deposition, electrodeposition, electrophoretic deposition, or electroless deposition (as described in Sassin et al, ACS Nano, 4 (2010) and Sassin et al, Acc. Chem. Res., DOI: 10.1021/ar2002717).

The conductive material 50 may have a thickness of less than or equal to 100 micrometers, a thickness of less than or equal to 50 micrometers, a thickness of less than or equal to 10 micrometers, and/or a thickness of less than or equal to 1 micrometer. The graphene nanosheet material 52 is less than 100% of the combined volume of the graphene nanosheet material 52 and the charge storage material 54. Alternatively, the graphene nanosheet material 52 is less than 50%, or even 10%, of the combined volume of the graphene nanosheet material 52 and the charge storage material 54. As another alternative, the graphene nanosheet material 52 is less than 1% of the combined volume of the graphene nanosheet material 52 and the charge storage material 54.

As an alternative to filling voids, or in addition to filling voids, the charge-storage material 54 may coat the graphene nanosheet material 52. This may be accomplished through any of a variety of suitable coating processes. It may be advantageous to not fill the voids completely, because double layer charge storage materials, pseudocapacitor charge storage materials, intercalation materials, and kinetically fast faradaic charge storage materials primarily store charge on or near their surface only. It may be desirable not to fully densify the coating, so that more of the surface is available for charge storage FIGS. 6A and 6B shows a simple EDLC 80 using a conductive material 82, similar to the conductive material 50 (FIG. 3) described above. The EDLC 80 has a substrate 84 that provides structural (physical) support to the other layers and structures of the EDLC 80. The substrate 84 may be any of a variety of suitable dielectric materials. For instance, the dielectric substrate may include a suitable glass, ceramic, or a suitable dielectric polymer material.

A conductive substrate 88 is formed on the dielectric substrate 84. The conductive substrate 88 provides a base for subsequent deposition, growth, or other placement of the conductive material 82. The vertically-oriented graphene nanosheet of the conductive material 82 is adhered to the conductive substrate 88. The conductive substrate 88 includes a material with at least some carbon solubility. The conductive substrate may include a conductive metal, for example nickel, or nickel on top of chromium. The conductive substrate 88 may be deposited on the dielectric substrate 84 by sputtering, thermal evaporation, or another suitable technique. The conductive substrate 88 may have a thickness of about 0.01 µm or greater.

In the EDLC 80, electrical conductivity across the conductive material 82 is primarily through the conductive substrate 88. The graphene nanosheet material of the conductive material 82 may be grown on the conductive substrate 88 by any of a variety of suitable methods, such as chemical vapor deposition, atmospheric pressure processes (such as decomposing methane), or high temperature processes such arc discharge or plasma spraying. The growth process may involve formation of carbon islands on the conductive substrate 88, with the carbon islands coalescing and the carbon sheets on them turning upward to form the vertically growing parts of the graphene nanosheet material with voids created within or between nanosheets. The conductive material 82 may have a thickness of less than 1 µm to a thickness greater than 10 µm.

After formation of the conductive substrate 88 and addition of the conductive material 82 on the dielectric substrate 84, a gap 90 is formed in the conductive material 82 and the conductive substrate 88 to divide the two layers into a pair of electrodes 92 and 94. The gap 90 is shown as a single straight line in the embodiment of FIGS. 6 and 7, but alternatively the gap may have a more complicated shape, and more than one gap may be formed (to produce three or more electrodes, for instance).

The gap 90 may be formed by any of a variety of suitable methods, such as by laser ablation, chemical etching, plasma etching, mechanical abrading, sand blasting, or scribing. The gap 90 may have a width of from 0.1 µm to 25 µm or from 1 µm to 10 µm. Alternatively, the gap may be produced via photolithography processes commonly used in the semiconductor wafer fabrication industry.

Finally an electrolyte 98 is placed over the gap 90, in contact with the electrodes 92 and 94 on opposite sides of the gap 90. The electrolyte 98 may be any of a variety of suitable electrolyte materials, such as (for instance) liquid salt-solvent solutions, ionic liquids, liquid molten salts, solid ionic conductors, a gelled salt-water solution, a gelled salt-non aqueous solvent solution. The salt may be any suitable chemical that can disassociate when dissolved in a solution. The gelling material may be organic, for instance PVA, or inorganic, for instance colloidal silica. The electrolyte 98 may be deposited by any of a variety of suitable methods, such as dipping, painting, spraying or printing.

The electrolyte material 98, in combination with the two electrodes 92 and 94, produces an energy storage device. The graphene and the charge storage material, the two components of the conductive material 82, both contribute to the charge storage in the EDLC 80. For instance, from 1% to 20% of charge storage of the capacitor may be due to the graphene, while from 80% to 99% of the charge storage of the capacitor may be due to the charge-storage material.

The EDLC 80 may include additional layers, such as covering or packaging layers. The configuration shown in FIGS. 6A and 6B is only one of a large variety of possible configurations, only some of which are described herein.

With reference to FIG. 7, another alternative is an asymmetric electrochemical capacitor 99, where a first electrode 100 includes a double layer charge storage material and the second electrode 101 includes a pseudocapacitor or a faradaic charge storage material. Examples of electrode material pairs include a NiOOH positive electrode material and an activated carbon negative electrode, or an activated carbon material positive electrode and a lithium intercalation material (pseudocapacitor) negative electrode.

Figure 8:
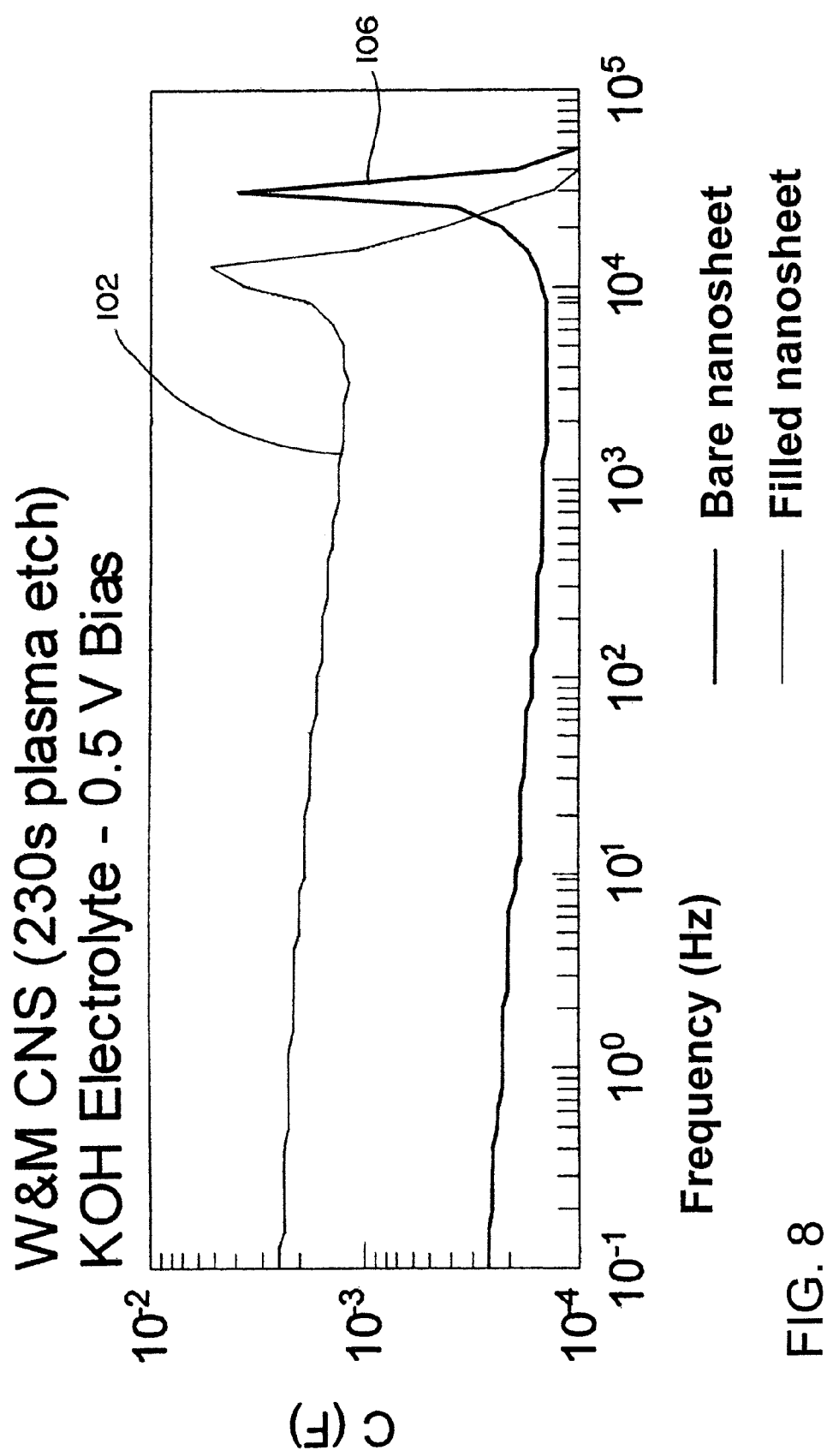
FIG. 8 is a graph comparing performance of an electric double layer capacitor in accordance with the present invention, with an unfilled electric double layer capacitor.
Figure 9:
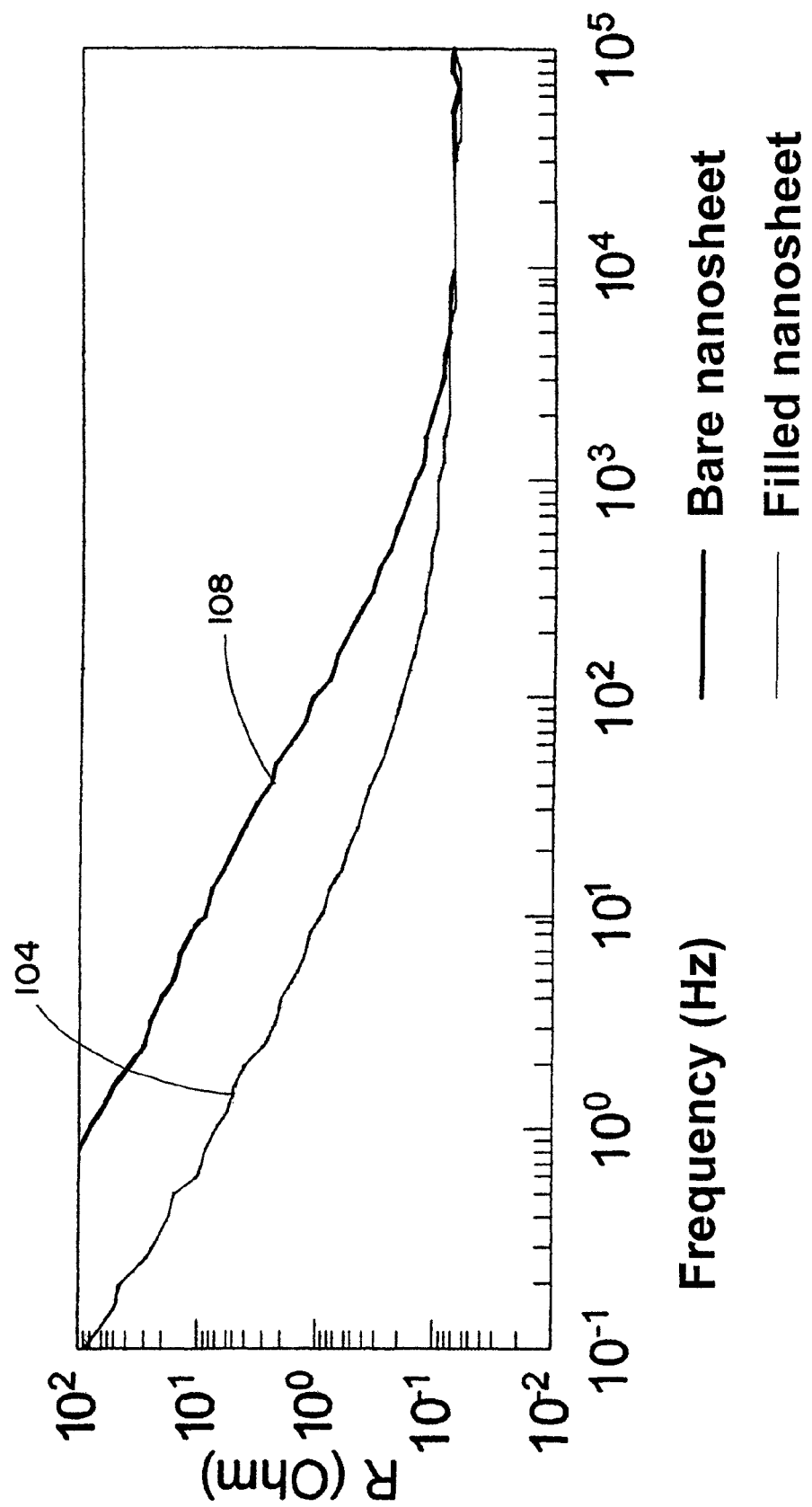
FIG. 9 is another graph comparing performance of an electric double layer capacitor in accordance with the present invention, with an unfilled electric double layer capacitor.

Referring now to FIGS. 8 and 9, some results are shown comparing the performance of EDLC, such as the EDLC 80, with a conductive material that includes charge-storage material in voids, with a performance of a comparable device without charge-storage material in voids. The comparison was developed using complex impedance data to create the two graphs shown in FIGS. 8 and 9, which assumed a series-RC circuit model (C in the FIG. 8 graph is $-1/(2\pi Z_{imag})$ and R in the FIG. 9 graph is $Z_{real}$), where $Z_{imag}$ is the imaginary part of the complex impedance and $Z_{real}$ is the real part of the complex impedance. It should be noted that the reason for FIG. 8's upturn in C at high-frequency is because of the overly simplistic model—at the self-resonant frequency $Z_{imag}$ becomes zero and this makes C diverge. This artifact of the model should be ignored.

In FIGS. 8 and 9 the results corresponding to the EDLC with charge storage material in voids are shown at reference numbers 102 and 104, respectively. The results corresponding to the capacitor without charge-storage material in voids are shown at reference numbers 106 and 108.

The results show that placing a conductive charge storage material in voids reduces the series resistance R. Notice that the R value in FIG. 9 at all frequencies below ~1 kHz is below that of the R value of the bare nanosheet. The table below lists information at two frequencies. Comparing the bare and filled electrodes at 120 Hz, C increased 10 fold and

| ELECTRODE | C @ 1 kHz (mF) | R @ 1 kHz (Ω) | RC @ 1 kHz (s) | C @ 120 Hz (mF) | R @ 120 Hz (Ω) | RC @ 120 Hz (s) | Frequency Θ = −45° (kHz) |
|---|---|---|---|---|---|---|---|
| Bare Nanosheet | 0.143 | 0.164 | 0.0235 | 0.160 | 0.864 | 0.138 | 12.5 |
| Filled Nanosheet | 1.33 | 0.0956 | 0.127 | 1.60 | 0.177 | 0.283 | 1.25 |

R decreased 5 fold, causing an increase in the RC product of only 2.0 times. Thus the response time only dropped two fold. And at 1 kHz, C increased 9.4 times and R decreased 1.7 times, causing an increase in the RC-product of 5.4 times. This suggests that there may be an optimum filling for any given nanosheet structure, fill material, and operating frequency.

Figure 10:
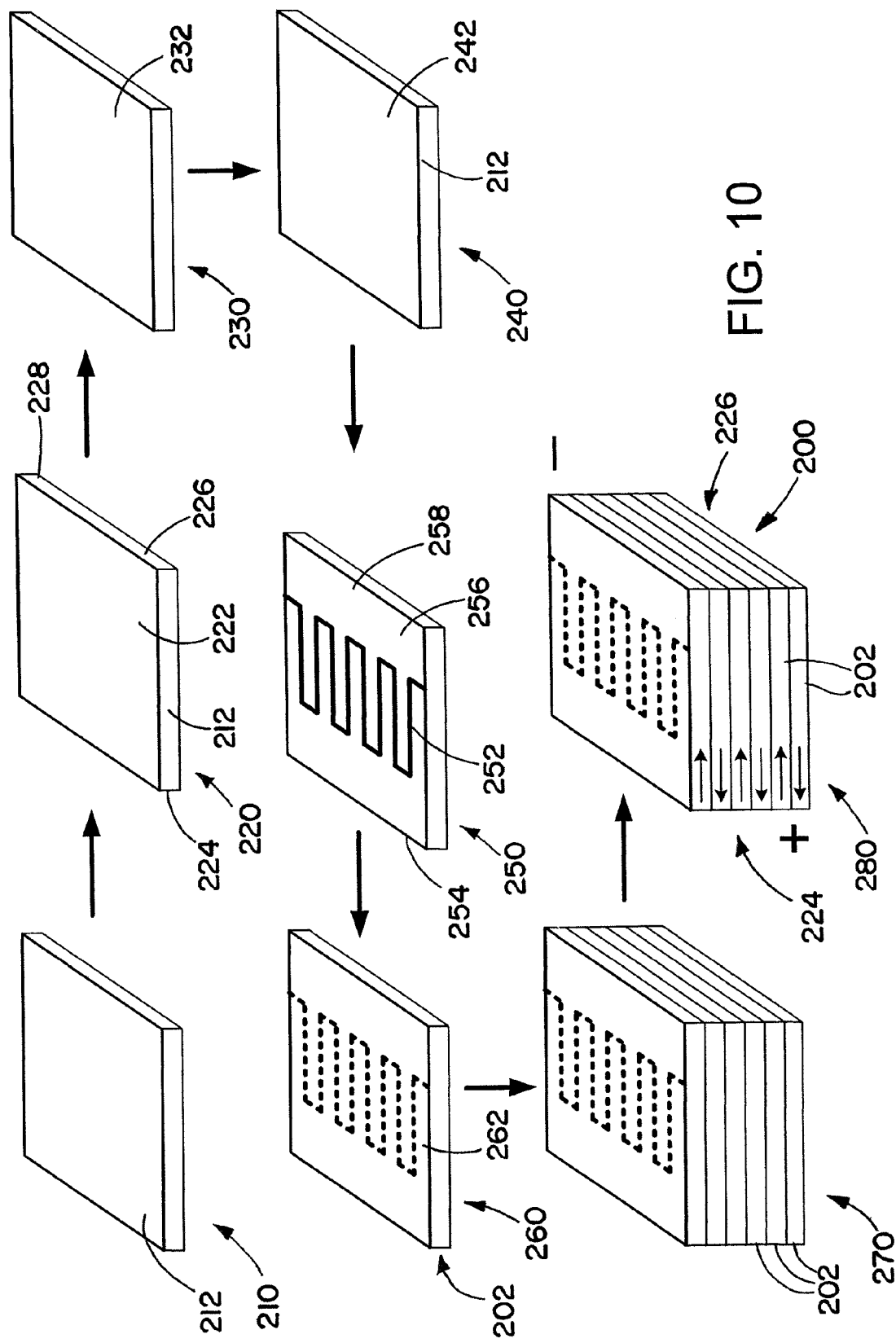
FIG. 10 illustrates steps in the construction of a stacked capacitor, according to an embodiment of the invention.

FIG. 10 illustrates a method of fabricating a stacked capacitor 200 with a number of cells 202, such as 100 cells, connected together in series. Each of the cells 202 may be a capacitor having a structure similar in general to that of the capacitor 80 (FIGS. 6 and 7). Various details about configurations and methods are omitted in the description given below.

Step 210 shows a dielectric substrate 212 for one of the cells 202. The dielectric substrate 212 may have dimensions of about 1" by 1" by 0.001", as one example among many.

In step 220 a top (major) surface 222 and two opposing edge surfaces 224 and 226 of the dielectric substrate 212 are metalized to form a metal layer 228. The metallization may be with nickel or another metal.

In step 230 graphene nanosheet material 232 is grown on the metalized major surface 222, and in step 240 the graphene nanosheet material 232 is overcoated with carbon or another charge-storage material 242 to fill in voids in the graphene 232. Various options for these steps are described above.

Laser scribing is used in step 250 to create a gap 252 in the metal layer 228, the graphene 232, and the charge-storage material 242. The gap 250 has a serpentine shape, creating two electrodes 254 and 256 with interdigitated fingers 258. The fingers 258 may have any of a variety of sizes, for example having a width of 100 to 500 µm, and a length of 0.5 mm to 2 cm. The use of the interdigitated fingers allows more efficient charge storage in the device, allowing more charge to be stored in a smaller volume. After formation of the gap 252, the cell 202 is overcoated with electrolyte 262 in step 260.

Multiple of the cells 202 are then stacked in step 270, and electrical interconnections are made in step 280. The electrical interconnections may be in a series string using an accordion-like connection between adjacent cells 202, alternating connections on opposing faces (the metallized edges 224 and 226). The result is a connected-string of cells capacitor 200 in which the cells 202 are connected together in series. The stack capacitor 200 may be capable of handling high voltages in a very compact package. For example a stack of 100 cells may have a height of about 0.1", and be capable of 300 volt operation.

Figure 11:
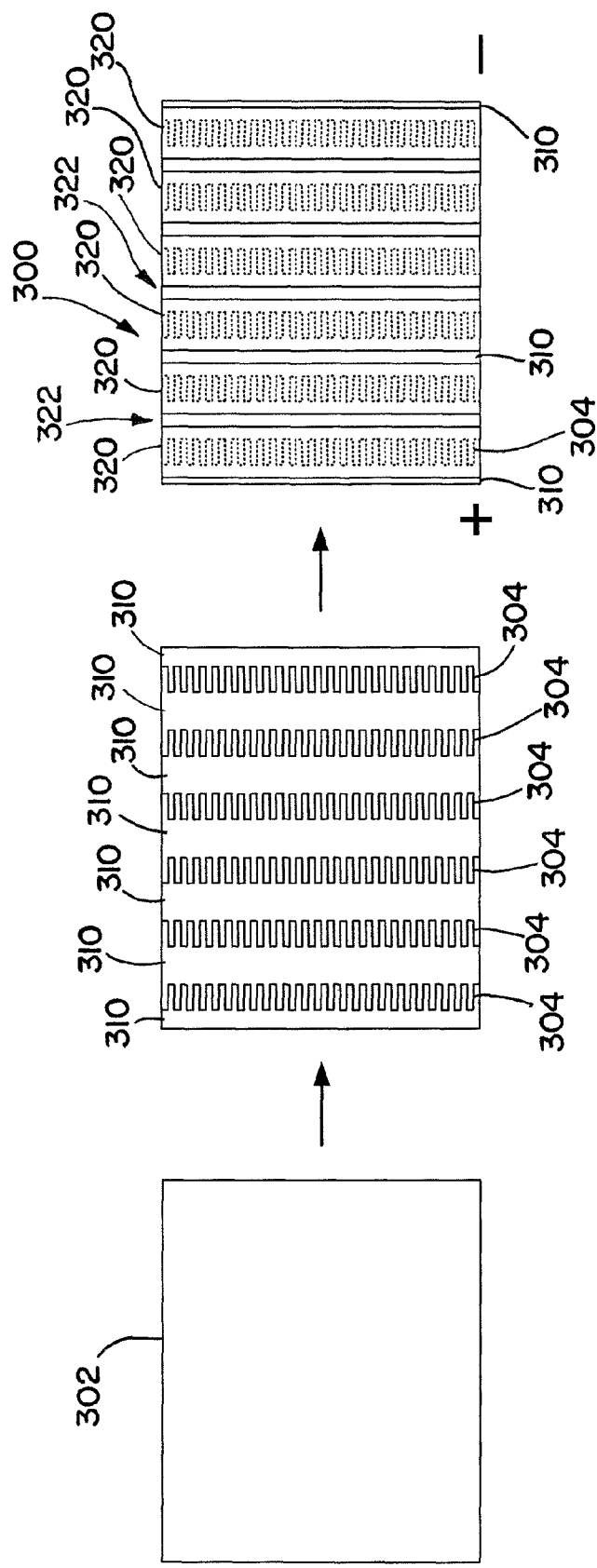
FIG. 11 illustrates steps in construction of a planar high-voltage capacitor, according to an embodiment of the invention.

FIG. 11 shows a top view of steps in construction of a planar high-voltage capacitor 300. The leftmost step shows an overcoated substrate 302 that already has the conductive substrate and the conductive material (graphene with voids containing charge-storage material) on it. In the middle step a laser scribing (or other) process is used to form a series of gaps 304, separating it into a number of different electrodes 310. The gaps 304 may have serpentine shapes that cause the electrodes 310 to have fingers that interdigitate with similar fingers of adjacent electrodes.

Finally, in the rightmost step, electrolyte 320 is applied in strips over the gaps 304 and adjoining portions of the electrodes 310. The strips 320, with spaces 322 between them, produce on the planar device 300 several capacitors that are then automatically connected electrically in series. The inside electrodes 310 (other than the leftmost and rightmost) each act as electrodes for two of the capacitor cells.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A capacitor device comprising:
   a dielectric substrate;
   a conductive substrate on the dielectric substrate;
   graphene material on the conductive substrate; charge-storage material amid the graphene material; and
   an electrolyte;
   wherein the conductive substrate, the graphene material, and the charge-storage material are separated into more than two electrodes, with a gaps between respective pairs of adjacent of the electrodes; and
   wherein the electrolyte is in separate strips, electrically isolated from one another with spaces between the strips, spanning respective of the gaps, with each of the strips in contact with one or both of the graphene material and the charge-storage material on both sides of one of the gaps, thereby forming multiple capacitors that are electrically coupled together in series.

2. The capacitor device of claim 1, wherein electrical conductivity across the conductive material is primarily through the conductive substrate.

3. The capacitor device of claim 1, wherein the electrolyte material is a solid electrolyte material.

4. The capacitor device of claim 1, wherein the electrolyte material is a gelled liquid electrolyte material.

5. The capacitor device of claim 1, wherein the electrolyte material is an ionic liquid material.

6. The capacitor device of claim 1, wherein the gaps each have a serpentine shape.

7. The capacitor device of claim 1, wherein the conductive substrate is a nickel substrate.

8. A planar capacitor device comprising:
   a dielectric substrate;
   a conductive material layer on the dielectric substrate, wherein the conductive material layer has at least two gaps therein, forming separate electrodes; and
   electrolyte material in separate strips, electrically isolated from one another with spaces between the strips, covering respective of the gaps, with each electrolyte material strip in contact with the electrodes on opposite sides of the respective gap, the electrodes and the electrolyte material strips thereby forming multiple capacitors that are electrically coupled together in series.

9. The capacitor device of claim 8, wherein the gaps each have a serpentine shape.

10. The capacitor device of claim 8, wherein the conductive material layer includes nickel.

11. The capacitor device of claim 8, wherein the conductive material layer includes a graphene material.

12. The capacitor device of claim 11, wherein the conductive material layer includes a charge-storage material amid the graphene material.

13. The capacitor device of claim 8, wherein the electrolyte material is a solid electrolyte material.

14. The capacitor device of claim 8, wherein the electrolyte material is a gelled liquid electrolyte material.

15. The capacitor device of claim 8, wherein the electrolyte material is an ionic liquid material.

16. The capacitor device of claim 8, wherein at least some of the electrodes are electrodes for multiple of the capacitors.

* * * * *